Patented Aug. 16, 1932

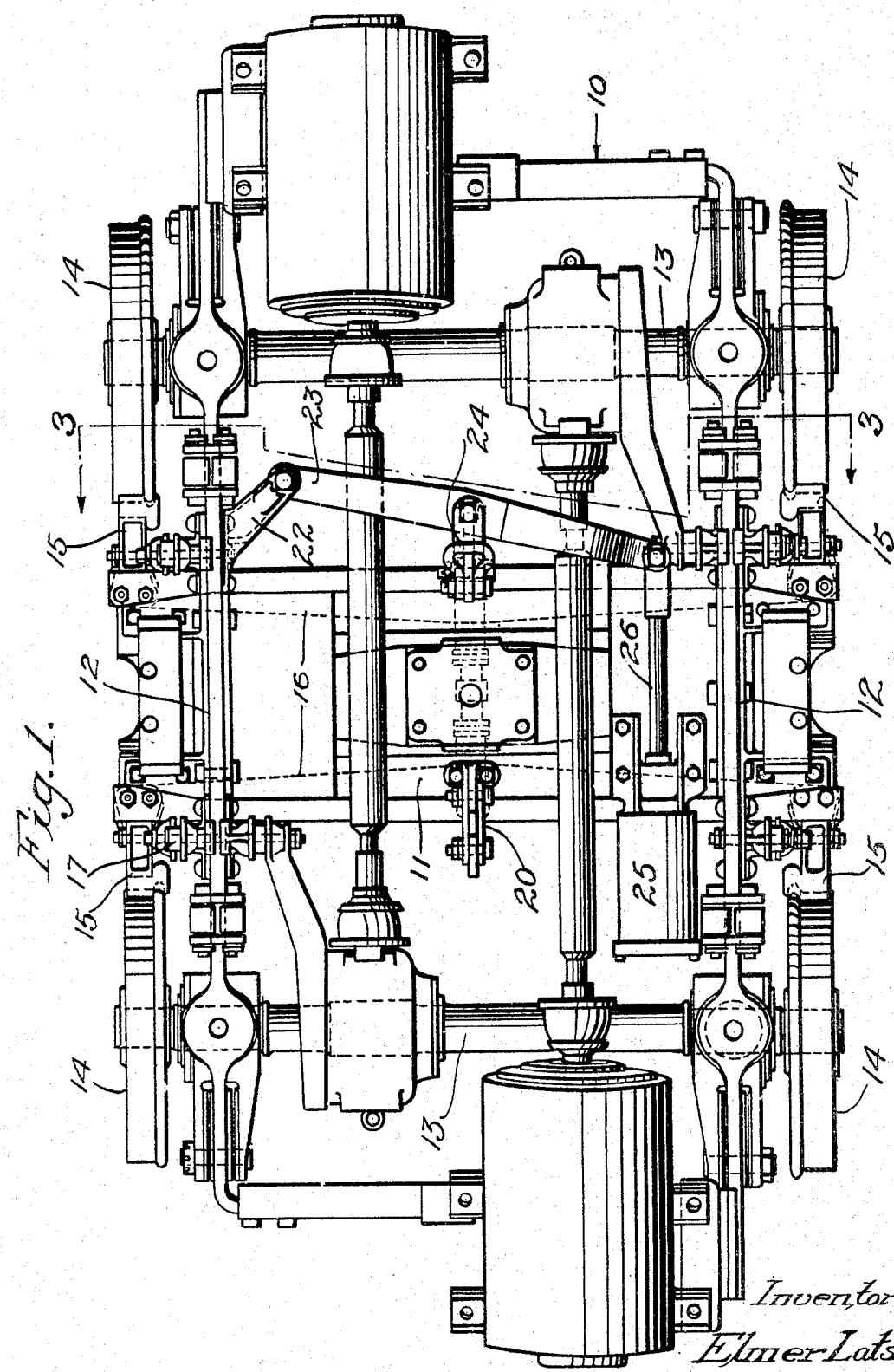

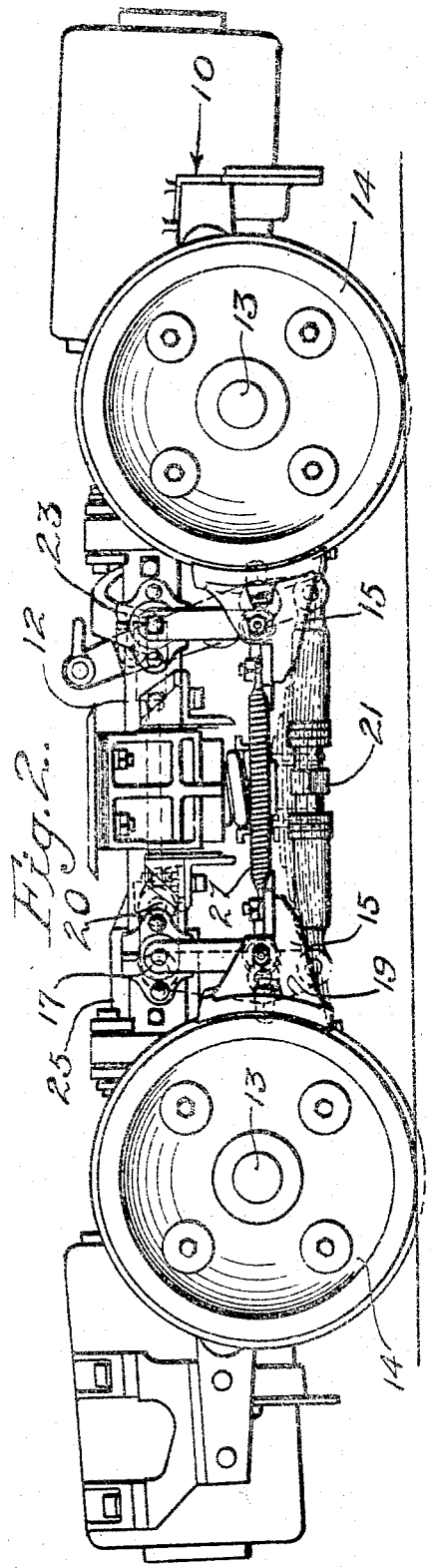
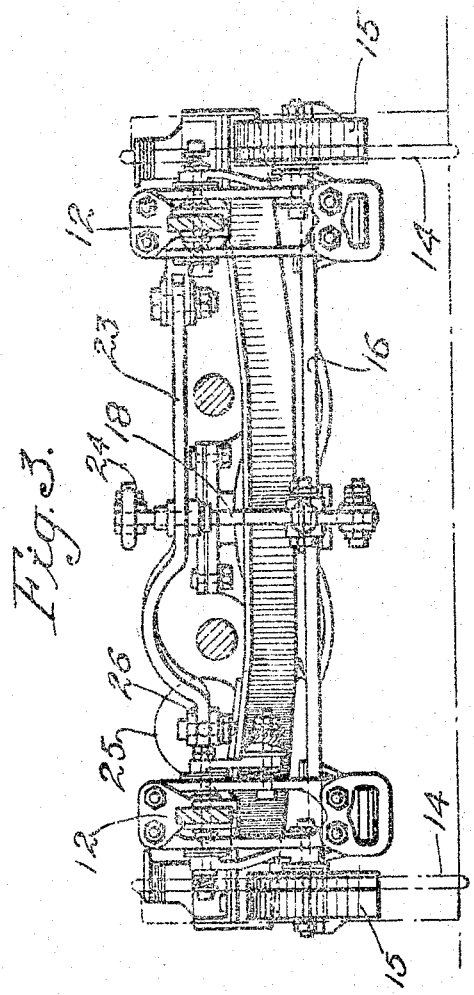

1,871,621

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

BRAKING APPARATUS     REISSUED

Application filed December 19, 1930. Serial No. 503,571.

This invention relates to braking apparatus for car trucks and more particularly to a braking means for use in car trucks of the type illustrated in my prior application Serial No. 426,196 for car trucks.

An important object of the invention is to provide a construction disassociating the braking cylinder from the car frame proper and transferring the mounting of this cylinder to the truck frame, thus avoiding the use of long brake rods and avoiding the wear occurring as a result of constant variation in distance between the car frame to which the cylinder is ordinarily applied and the truck frame to which the brake levers are applied.

A further object of the invention is the provision of a construction compacting the braking mechanism to the greatest possible extent.

These and other objects I attain by the construction shown in the accompanying drawings wherein, for the purpose of illustration, I have shown a preferred embodiment of my invention and wherein:

Fig. 1 is a plan view of a car truck embodying braking apparatus constructed in accordance with my invention;

Fig. 2 is a side elevation thereof; and

Fig. 3 is a section on line 3—3 of Fig. 1.

Referring now more particularly to the drawings, the truck illustrated in my prior application, hereinbefore referred to, includes a fame generally designated at 10 and including a centrally disposed transversely directed member 11 connecting the side members 12 thereof. This frame is supported from the usual axles 13 bearing driving wheels 14 adjacent faces of which driving wheels at each side of the truck are engaged by brake shoes 15. The shoes of wheels of the same axle are connected by transversely-extending beams 16 the ends of these beams being supported by link mechanisms 17 depending from the side members 12 of the truck frame 10. To one of these beams a vertically disposed lever 18 is connected intermediate its ends while to the other of the beams a lever 19 is connected intermediate its ends, the upper end of lever 19 being connected to one side of the transversely-extending member 11 of the frame at its upper end by link mechanism 20. The lower ends of levers 18 and 19 are connected by a link 21 which may comprise the usual slack take-up mechanism if so desired. In accordance with my invention, I secure to one of the side members 12 a fixed bracket 22 to which I secure one end of a transversely-extending horizontal lever 23 which approaches the upper end of lever 18 and is link connected thereto as indicated at 24. At the opposite side of the truck frame I secure a longitudinally directed brake cylinder 25 the piston rod 26 of which is connected to the free end of transversely-extending lever 23. It will be obvious that longitudinal movements of the rod 26 will cause oscillatory motion of brake lever 23 which through the levers 18, 19 and link 21, is transmitted to cause the longitudinal separation of brake beams 16 and a consequent application of the brakes. Springs 27 connecting the beams 16 tend to constantly move these beams toward one another so that upon release of air from the cylinders the brake shoes will move toward one another.

By use of a construction of this character the number of connections necessary is reduced and the wear upon these connections likewise reduced.

Since the arrangement employed is obviously capable of a certain range of change and modification without departing from the spirit of my invention, I do not wish to be understood as limiting myself thereto except as hereinafter claimed.

I claim:

1. In a car truck, a frame, a brake cylinder secured to the frame at one side thereof, a brake lever pivoted at one end to the frame adjacent the opposite side thereof and at its opposite end to the rod of the cylinder piston, and brake means operatively connected to said lever intermediate the ends thereof.

2. In a car truck, a frame, a longitudinally-extending brake cylinder secured to the frame adjacent one side thereof, a transversely-extending brake lever pivotally connected at one end to the rod of the cylinder piston and at its opposite end to the frame, and brakes operatively connected to said lever to be actuated thereby.

3. In a car truck, a frame, a longitudinally-extending brake cylinder secured to the frame adjacent one side thereof, a transversely-extending brake lever pivotally connected at one end to the rod of the cylinder piston and at its opposite end to the frame, a pair of transversely-extending brake beams, a pair of vertically-extending levers, one associated with each brake beam, each lever being connected to its associated beam at the outer edge of the beam and at a point spaced below the upper end of the lever, a link connection between the lower ends of the levers, a pivotal connection between the upper end of one lever and the frame and a pivotal connection between the upper end of the other lever and the transversely-extending lever at a point intermediate the ends of the transversely-extending lever.

4. In a car truck, a frame including spaced side members, a brake cylinder between said side members and secured to the frame adjacent one end thereof, a transversely-extending brake lever fulcrumed to the frame, a pivotal connection between the rod of the brake cylinder and one end of said lever and brakes operatively connected to said lever to be actuated thereby.

ELMER LATSHAW.